United States Patent
Kim et al.

(10) Patent No.: US 10,924,154 B2
(45) Date of Patent: Feb. 16, 2021

(54) ELECTRONIC DEVICE FOR TRANSMITTING OR RECEIVING SIGNAL AND METHOD THEREFOR

(71) Applicant: Samsung Electronics Co., Ltd., Suwon-si (KR)

(72) Inventors: Man Seob Kim, Suwon-si (KR); Hyoungjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/499,006

(22) PCT Filed: Mar. 28, 2018

(86) PCT No.: PCT/KR2018/003669
§ 371 (c)(1),
(2) Date: Sep. 27, 2019

(87) PCT Pub. No.: WO2018/182314
PCT Pub. Date: Oct. 4, 2018

(65) Prior Publication Data
US 2020/0076466 A1    Mar. 5, 2020

(30) Foreign Application Priority Data
Mar. 28, 2017   (KR) ........................ 10-2017-0039555

(51) Int. Cl.
*H04B 1/44*     (2006.01)
*H04B 1/401*    (2015.01)
(Continued)

(52) U.S. Cl.
CPC .............. *H04B 1/44* (2013.01); *H04B 1/401* (2013.01); *H04B 7/0686* (2013.01); *H04B 7/0868* (2013.01); *H04W 88/06* (2013.01)

(58) Field of Classification Search
CPC ........ H04B 1/44; H04B 1/401; H04B 7/0686; H04B 7/0868; H04B 1/0064; H04W 88/06
See application file for complete search history.

(56) References Cited

U.S. PATENT DOCUMENTS 6,509,872 B2   1/2003  Ishii et al.
9,380,570 B2   6/2016  Takeda et al.
(Continued)

FOREIGN PATENT DOCUMENTS

KR   10-2014-0099890 A   8/2014
KR   10-2014-0144180 A   12/2014
(Continued)

OTHER PUBLICATIONS

ISA/KR, International Search Report and Written Opinion of the International Searching Authority, International Application No. PCT/KR2018/003669, dated Jul. 12, 2018, 12 pages.

*Primary Examiner* — Jean B Corrielus

(57) ABSTRACT

Disclosed is an electronic apparatus. The electronic apparatus may include a communication circuit including a plurality of ports, each of which transmits a signal in at least one frequency band and transmitting or receiving a signal in the at least one frequency band and a processor is configured to obtain frequency band information indicating the at least one frequency band and context information indicating a state of the electronic apparatus and to determine a port to be used for the respective at least one frequency band among the plurality of ports based on the obtained information. Other various embodiments as understood from the specification are also possible.

13 Claims, 8 Drawing Sheets

(51) Int. Cl.
  *H04B 7/06*    (2006.01)
  *H04B 7/08*    (2006.01)
  *H04W 88/06*   (2009.01)

(56)         References Cited

U.S. PATENT DOCUMENTS

| | | |
|---|---|---|
| 9,444,425 B2 | 9/2016 | Mow et al. |
| 9,444,540 B2 | 9/2016 | Yu et al. |
| 9,866,367 B2 | 1/2018 | Kim et al. |
| 9,960,491 B1 * | 5/2018 | Broyde ................. H01Q 7/005 |
| 2002/0041253 A1 | 4/2002 | Ishii et al. |
| 2012/0113873 A1 * | 5/2012 | Sanchez ................. H04B 1/006 |
| | | 370/277 |
| 2013/0149975 A1 | 6/2013 | Yu et al. |
| 2015/0043474 A1 | 2/2015 | Takeda et al. |
| 2015/0226329 A1 | 8/2015 | Bedeschi |
| 2015/0372656 A1 | 12/2015 | Mow et al. |
| 2016/0276748 A1 | 9/2016 | Ramachandran et al. |
| 2017/0257207 A1 | 9/2017 | Kim et al. |

FOREIGN PATENT DOCUMENTS

| | | | |
|---|---|---|---|
| KR | 10-2016-0062833 A | 6/2016 | |
| KR | 10-2016-0147975 A | 12/2016 | |

* cited by examiner

ELECTRONIC DEVICE FOR TRANSMITTING OR RECEIVING SIGNAL AND METHOD THEREFOR

CROSS-REFERENCE TO RELATED APPLICATIONS

This application is a 371 National Stage of International Application No. PCT/KR2018/003669, filed Mar. 28, 2018, which claims priority to Korean Patent Application No. 10-2017-0039555, filed Mar. 28, 2017, the disclosures of which are herein incorporated by reference in their entirety.

BACKGROUND

1. Field

Embodiments disclosed in this specification relates to a technology for transmitting and receiving a signal in a wireless communication system.

2. Description of Related Art

A radio frequency integrated circuit (RFIC) is one of the important elements that allow the signal of a specific frequency to be transmitted and received in a wireless communication environment. With the change of a user environment to require the latest high speed communication technology, the study on the RFIC simultaneously using two or more communication technologies or communication frequencies, such as long term evolution (LTE) carrier aggregation (CA) or LTE Wi-Fi CA.

An electronic apparatus may use an RF port of the preset RFIC for each frequency band. For example, the conventional electronic apparatus may receive a signal of the first frequency band, using the specified antenna among two or more antennas capable of receiving the signal of the first frequency band. Except in the case where there is a predefined exception rule, the conventional electronic apparatus manually uses the specified antenna to receive the signal of the first frequency band.

SUMMARY

The RF port connected to each antenna in a conventional electronic apparatus is determined by an RF driver performing the predetermined operation. According to the recent trend of increasing the condition that may affect the communication environment such as Bluetooth earphones or the like, the RF port settings of the conventional electronic apparatus using only the frequency band information may be inefficient.

Because the complexity of the RF driver increases when the RF driver operates an RF port for each CA combination as exception processing, the number of cases capable of being processed as an exception may be limited.

Various embodiments disclosed in this specification may provide a method of determining a port for improving the inefficiency that may occur in the above-described context by using various pieces of information other than the frequency band information, and an apparatus therefor.

According to an embodiment disclosed in this specification, an electronic apparatus may include a communication circuit including a plurality of ports, each of which transmits a signal in at least one frequency band and transmitting or receiving a signal in the at least one frequency band, a processor, and a memory electrically connected to the processor. The memory may include instructions that causes the processor to obtain frequency band information indicating the at least one frequency band and context information indicating a state of the electronic apparatus and to determine a port to be used for the respective at least one frequency band among the plurality of ports based on the obtained information.

According to embodiments disclosed in the specification, an electronic apparatus may determine an appropriate RF port suitable for a communication environment, using context information indicating various contexts.

Besides, a variety of effects directly or indirectly understood through the disclosure may be provided.

BRIEF DESCRIPTION THE DRAWINGS

SUMMARY

Figure 1:
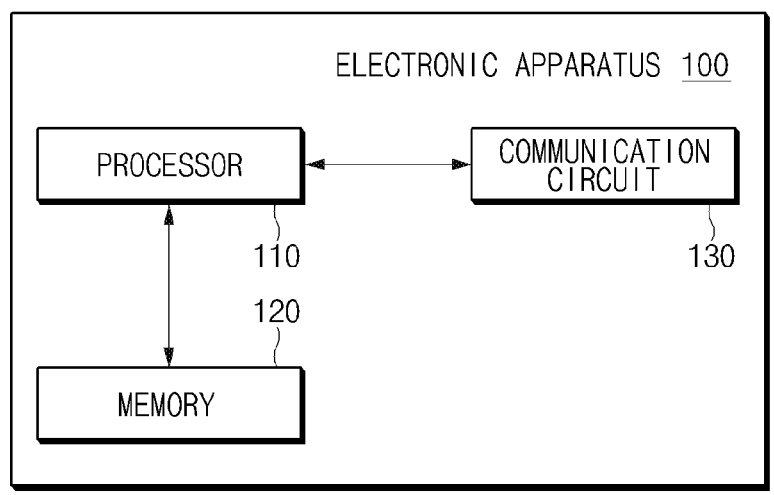
FIG. 1 is a block diagram illustrating a configuration of an electronic apparatus, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing from the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic apparatus according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic apparatus may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic apparatus may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic apparatus may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic apparatus may be one of the above-described devices or a combination thereof. An electronic apparatus according to an embodiment may be a flexible electronic apparatus. Furthermore, an electronic apparatus according to an embodiment of the disclosure may not be limited to the above-described electronic apparatuses and may include other electronic apparatuses and new electronic apparatuses according to the development of technologies.

Hereinafter, electronic apparatuses according to various embodiments will be described with reference to the accompanying drawings. In the disclosure, the term "user" may refer to a person who uses an electronic apparatus or may refer to a device (e.g., an artificial intelligence electronic apparatus) that uses the electronic apparatus.

FIG. 1 is a block diagram illustrating a configuration of an electronic apparatus, according to an embodiment.

Referring to FIG. 1, an electronic apparatus 100 may include a processor 110, a memory 120, and a communication circuit 130.

According to an embodiment, the processor 110 may control components of the electronic apparatus 100 according to various embodiments disclosed in the specification and may perform an operation according to various embodiments disclosed in the specification. For example, the processor 110 may obtain context information associated with the electronic apparatus 100 and may determine a radio frequency (RF) port for transmitting or receiving a signal depending on the context information. The RF port may be an interface that receives a signal from a radio frequency front end (RFFE) at a RFIC 131 and outputs a signal to the RFFE.

According to an embodiment, the context information may include at least one of: peripheral device connection information, information about a peripheral device connected to the electronic apparatus, sensor information of the electronic apparatus, wireless fidelity (Wi-Fi) connection information of the electronic apparatus, frequency band information, CA mode information, primary component carrier (PCC), secondary component carrier (SCC) information, and screen information.

According to an embodiment, the processor 110 may include a communication processor (CP) or an application processor (AP) that performs the operation and control, which are associated with communication. According to an embodiment, the electronic apparatus 100 may further include a separate processor (not illustrated) other than the processor 110. According to an embodiment, the separate processor may be implemented with at least one of CP or AP.

According to an embodiment, the memory 120 may store instructions that cause the processor 110 to control another component or to perform an operation according to various embodiments.

According to an embodiment, the communication circuit 130 may include a plurality of RF ports that deliver the transmitted signal or the received signal. The plurality of RF ports may be associated with a plurality of antennas, respectively. The communication circuit 130 may transmit or receive a signal in one frequency band or a plurality of frequency bands. The communication circuit 130 may support CA. The communication circuit 130 may transmit or receive a signal in a plurality of CA frequency bands. The communication circuit 130 may use the RF port set by the processor 110.

The configuration of the electronic apparatus 100 illustrated in FIG. 1 is an example and is variously changed to implement various embodiments disclosed in this specification.

Figure 2:
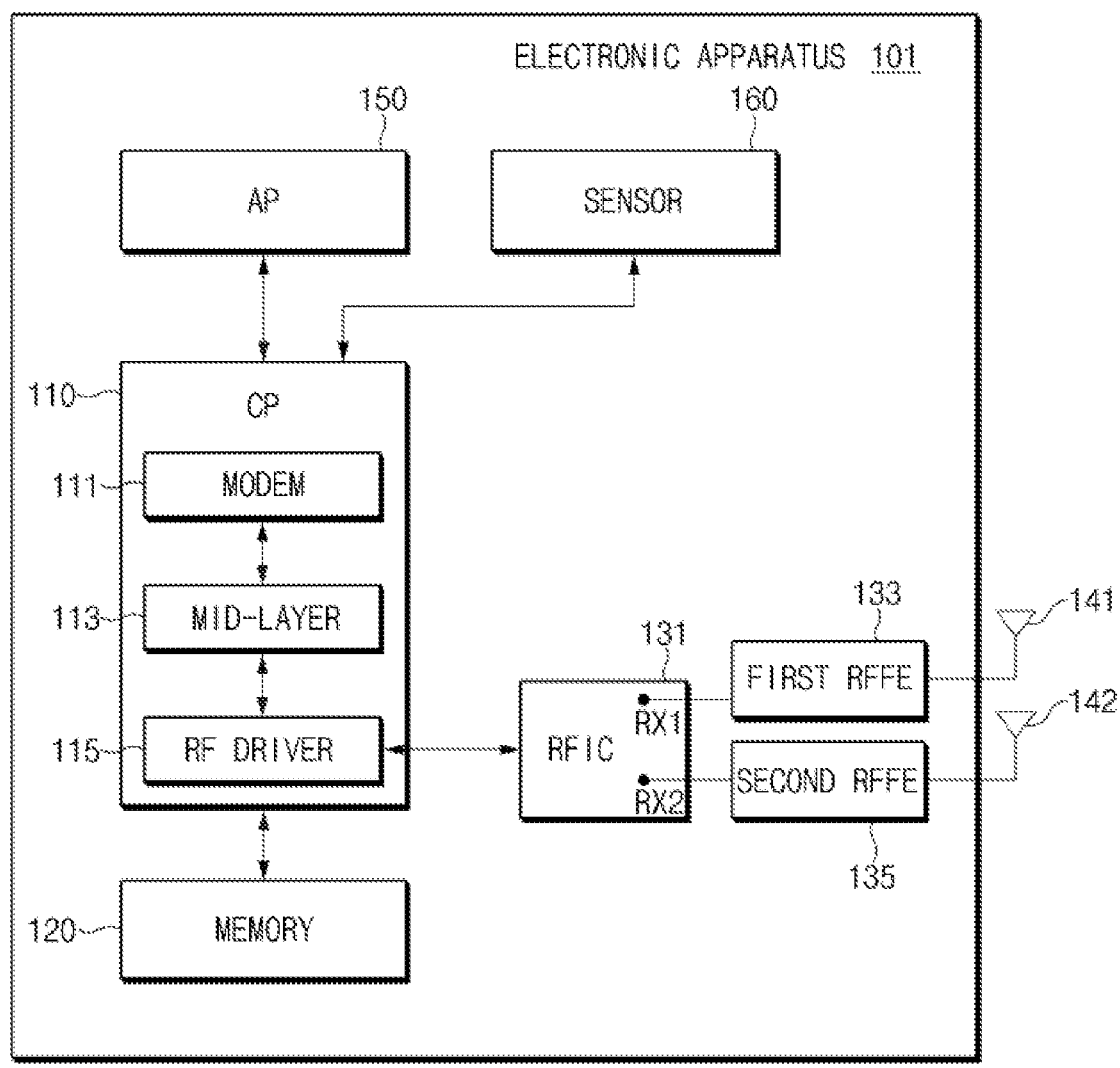
FIG. 2 illustrates the detailed configuration of an electronic apparatus, according to an embodiment.

FIG. 2 is a block diagram illustrating a detailed configuration of an electronic apparatus, according to an embodiment.

Referring to FIG. 2, an electronic apparatus 100 may include a plurality of antennas 141 and 142, an application processor (AP) 150 and a sensor 160. An embodiment is exemplified in FIG. 2 as the two antennas 141 and 142 are illustrated. However, the electronic apparatus 100 may include three or more antennas. The processor 110 of FIG. 1 may correspond to the CP 110 of FIG. 2. Furthermore, the communication circuit 130 of FIG. 2 may correspond to the RFIC 131 of FIG. 2 and/or a plurality of RFFEs 133 and 135. The description overlapping with the electronic apparatus 100 of FIG. 1 is omitted in the electronic apparatus 100 of FIG. 2.

The AP 150 and/or the sensor 160 may transmit context information of the electronic apparatus 100 to the CP 110. In an embodiment, the context information may include information indicating the state of the electronic apparatus 100. For example, the context information may include at least one of information about a peripheral device connected to the electronic apparatus, sensor information of the electronic apparatus, peripheral device connection information, Wi-Fi connection information, frequency band information, CA mode information, PCC or SCC information, and screen information. In an embodiment, the context information may be classified into AP information, sensor information, and CP information depending on the entity that generates the information.

According to an embodiment, the AP 150 may generate context information such as the peripheral device connection information. The sensor 160 may sense the change in the physical state of the electronic apparatus 100 or the change in the operation of the electronic apparatus 100 and may convert the sensed information into an electrical signal. According to an embodiment, the information generated by the sensor 160 may be referred to as "sensing information". The sensing information may be transmitted to the AP 150 or the CP 110; the AP 150 or the CP 110 may generate sensor information or context information indicating the state of the electronic apparatus 100.

The CP 110 may obtain the context information and may determine an RF port for transmitting or receiving a signal depending on the context information. The CP 110 may generate the context information or may obtain the context information from the AP 150 or the sensor 160.

According to an embodiment, the CP 110 may include a modem 111, a mid-layer 113, and an RF driver 115. At least part of the sub-components of the CP 110 may be implemented in hardware and the remaining parts may be implemented in software. For example, the modem 111 may be implemented in hardware, but the mid-layer 113 and the RF driver 115 may be implemented in software.

According to an embodiment, the modem 111 may obtain the context information from the AP 150 or the sensor 160 or may generate the context information. According to an embodiment, the context information generated by the modem 111 may include frequency band information indicating at least one frequency band at which a signal is transmitted and received. In an embodiment, the frequency band information may include CA frequency combination information. According to an embodiment, the context information generated by the modem 111 may include CA information. The CA information may include CA information indicating whether CA is possible and/or CA mode information indicating a CA mode.

The CA technology may be classified into an inter-band CA aggregating carriers in different bands or an intra-band CA aggregating carriers in the same band. The CA frequency combination may be the combination of frequencies in different bands or the combination of frequencies in the same band. The CA frequency combination may be the combination of frequencies continuous in the same band or frequencies discontinuous in the same band.

The mid-layer 113 may obtain the context information and may determine an optimal RF port applied to the RFIC 131 based on the obtained context information. The mid-layer 113 may generate port information indicating the determined RF port and may deliver the generated port information to the RF driver 115. In an embodiment, the mid-layer 113 may receive the context information from the AP 150 and/or the sensor 160 and may generate the context information based on the information received from the AP 150 and/or the sensor 160. In another embodiment, the mid-layer 113 may obtain the context information from the modem 111.

The RF driver 115 may connect the RFIC 131 to the CP 110. In an embodiment, the RF driver 115 may connect the RFIC 131 to the modem 111 or may connect the RFIC 131 to the mid-layer 113. The RF driver 115 may set the RFIC 131 depending on the port information. The RF driver 115 may set an RF port that transmits the input/output signal of the RFIC 131, depending on the port information.

According to an embodiment, the electronic apparatus 100 may include the RFIC 131 and a plurality of RFFEs 133 and 135. According to an embodiment, the RFIC 131 may include a plurality of RF ports (e.g., Rx #1 and Rx #2 of FIG. 2). The RFIC 131 may deliver a signal to the plurality of RFFEs 133 and 135 via the plurality of RF ports or may receive a signal from the plurality of RFFEs 133 and 135. The RFIC 131 may process a signal transmitted or received through at least one frequency band. The RFIC 131 may deliver the signal in the at least one frequency band to the at least one RFFE 133 or 135 via an RF port determined by the CP 110 or may obtain the signal in the at least one frequency band from the at least one RFFE 133 or 135.

The RF port may be an interface for receiving the signal processed by the RFFE 133 or 135 at the RFIC 131 or for delivering the signal processed by the RFIC 131 to the RFFE 133 or 135. The RF port may be associated with an antenna. For example, a single RF port may be connected to a single antenna. RF ports may be electrically connected to a plurality of antennas having different performances or a plurality of antennas having performances, each of which is changed depending on the context information, respectively. For convenience of description, an embodiment is exemplified in FIG. 2 as RF ports are the reception ports Rx #1 and Rx #2. However, each of the RF ports may be configured with various configurations. For example, the RF port may include a transmission port or a transmission/reception port.

The plurality of RFFEs 133 and 135 may perform proper processing for receiving or transmitting a signal via the plurality of antennas 141 or 142. For example, the RFFE 133 and 135 may include an element for amplifying a signal or an element for removing noise. Each of the plurality of RFFEs 133 and 135 may obtain a signal from the RFIC 131 via the RF port or may deliver a signal to the RFIC 131 via the RF port. The single RFFE (e.g., 133) may be connected to the single antenna 141. The number of RFFEs may be changed according to various embodiments.

The RFFEs 133 and 135 may be associated with RF ports of the RFIC 131, respectively. It may be assumed that the RFIC 131 includes a first port and a second port, the first RFFE 133 is associated with the first port, and the second RFFE 135 is associated with the second port. For example, when the electronic apparatus 100 determines the first port with respect to a specific signal, the specific signal may be transmitted to the first RFFE 133 through the first port of the RFIC 131. The specific signal may be processed by the first RFFE 133 and may be transmitted to an external apparatus through an antenna connected to the first RFFE 133.

According to an embodiment, the modem 111, the mid-layer 113, and the RF driver 115 may be implemented by the CP 110.

The configuration of the electronic apparatus 100 illustrated in FIG. 2 is an example and is variously changed to implement various embodiments disclosed in this specification.

Figure 3:
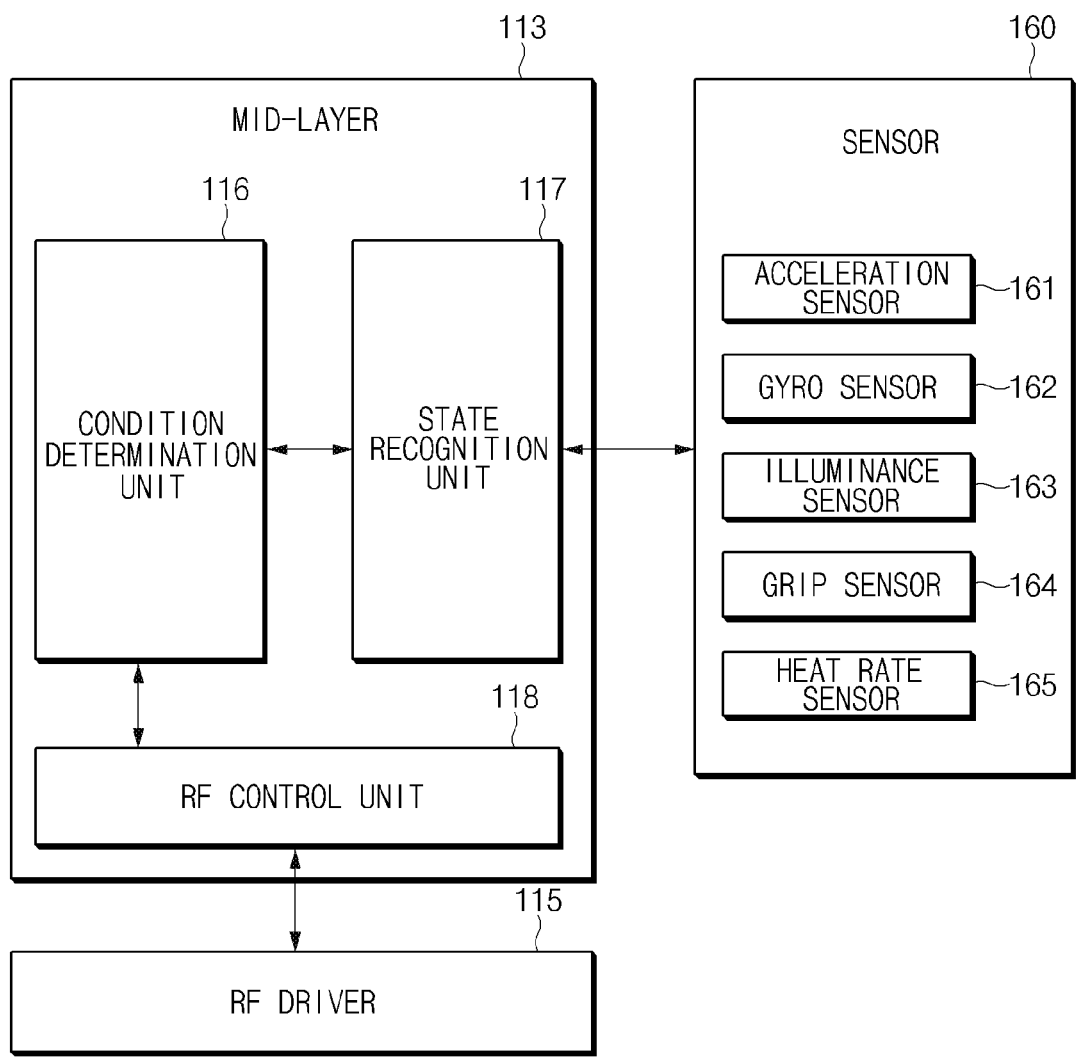
FIG. 3 is a view illustrating the partial configuration of an electronic apparatus according to an embodiment.

FIG. 3 is a detailed block diagram illustrating a configuration of a mid-layer (e.g., 113 of FIG. 2) of an electronic apparatus, according to an embodiment.

In an embodiment, the mid-layer 113 may obtain the signal generated by the sensor 160. For example, the mid-layer 113 may obtain the context information generated by the CP 110, the AP 150, or the sensor 160. The mid-layer 113 may determine a port to be used, based on the context information, may generate port information indicating the port to be used, and may transmit the port information to the RF driver 115. In an embodiment, the mid-layer 113 may generate the port information based on agile mapping. According to an embodiment, when the context information indicates different states, the mid-layer 113 may generate information about different ports. For example, it may be determined that the port to be used in a specific frequency band in the case where the context information is the first state is different from a port in the case where the context information is the second state.

According to an embodiment, the mid-layer 113 may include a condition determination unit 116, a state recognition unit 117, and/or an RF control unit 118.

According to an embodiment, the state recognition unit 117 may detect the signal generated by the sensor 160. The state recognition unit 117 may recognize the state of the electronic apparatus 100, based on the signal generated by the sensor 160. In an embodiment, the state recognition unit 117 may generate the context information based on the recognized state of the electronic apparatus 100.

According to an embodiment, the condition determination unit 116 may determine whether the context information satisfies a specific condition. According to various embodiments, the specific condition may include a connection mode in which a peripheral device is connected, a CA state where a plurality of frequency bands are aggregated, and a specific CA mode (e.g., data mode).

When the condition determination unit 116 determines that the specific condition is satisfied, according to an embodiment, the RF control unit 118 may determine an RF port corresponding to the specific condition. The RF control unit 118 may determine the combination of frequency bands and RF ports, depending on the specific condition. The RF control unit 118 may generate port information and may deliver the generated port information to the RF driver 115. In an embodiment, the combination of frequency bands and RF ports may be different from each other depending on the specific condition. The RF port may be a port mapped for the respective specific condition.

According to an embodiment, the sensor 160 may include at least one of an acceleration sensor 161, a gyro sensor 162, an illuminance sensor 163, a grip sensor 164, or a heart rate sensor 165.

For example, when the grip sensor 164 senses a user's hand grip, the grip sensor 164 may generate an electrical signal associated with the user's hand grip. The grip sensor 164 may deliver the electrical signal to the mid-layer 113.

The state recognition unit 117 of the mid-layer 113 may detect the electrical signal and then may recognize whether the user's hand grip occurs. The mid-layer 113 may deliver a signal for providing a notification that the hand grip occurs, to the condition determination unit 116.

The condition determination unit 116 may determine whether the hand grip is a condition for determining an RF port. When the hand grip is the condition for determining an RF port, the condition determination unit 116 may deliver information for providing a notification that the condition is satisfied, to the RF control unit 118. When the hand grip is not the condition for determining an RF port, the condition determination unit 116 may not deliver any information to the RF control unit 118 or may deliver information for providing a notification that the condition is not satisfied.

The RF control unit 118 may determine that the hand grip is the condition for determining a new RF port, and then may determine the new RF port suitable for the situation of the hand grip. The RF control unit 118 may deliver information about the determined RF port to the RF driver 115.

The configuration of the mid-layer 113 and the sensor 160 illustrated in FIG. 3 is an example, and various embodiments of the disclosure may be variously changed or modified. For example, the sensor 160 may include a gesture sensor (e.g., a gesture sensor 740A of FIG. 7).

Figure 4:
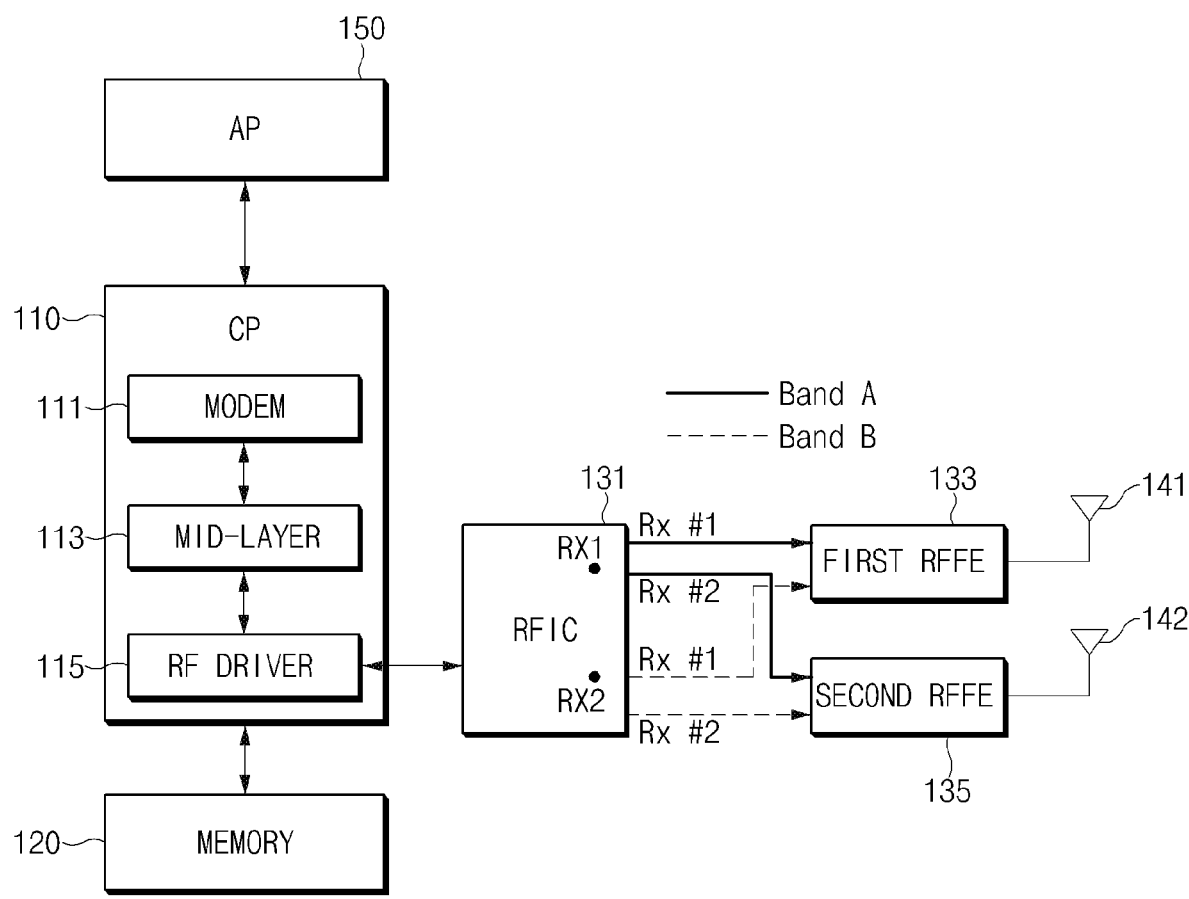
FIG. 4 is a view for describing an operation of an electronic apparatus, according to various embodiments.

FIG. 4 is a view for describing an operation of an electronic apparatus, according to various embodiments.

Hereinafter, the operation of the electronic apparatus 100 will be described based on the electronic apparatus 100 of FIG. 2. It is assumed in the following description that RF ports are capable of inputting and outputting signals in a plurality of frequency bands, respectively. In an embodiment, the RFIC 130 may include a plurality of RF ports. A plurality of reception ports may be referred to as Rx #1 and Rx #2, respectively. A single RF port may deliver signals in a plurality of frequency bands. The signals in a plurality of frequency bands may be referred to as band A and band B. An embodiment is exemplified in FIG. 4 as the number of RF ports is two and the number of frequency bands is two. However, the RFIC 130 may include various RF ports and various frequency bands.

In an embodiment, the electronic apparatus 100 may operate while dividing the first condition and the second condition. In an embodiment, when the first condition is satisfied, the electronic apparatus 100 may perform an operation of using the RF port predetermined for each frequency band. When the second condition is satisfied, the electronic apparatus 100 may perform an operation of using the RF port obtained based on context information.

Hereinafter, an embodiment of determining an RF port depending on a CA mode will be described.

In a CA situation where at least one carrier is added to one carrier, the electronic apparatus 100 may operate in different CA modes. The CA mode may be a setting mode, a data mode or a release mode. In a situation where multiple carriers are set for the electronic apparatus 100, the electronic apparatus 100 in the setting mode may perform an operation of activating a carrier for transmitting and receiving data for setting the carrier to be used. For example, the electronic apparatus 100 may receive a pilot signal, not actual data, in the setting mode (carrier aggregation configured). The electronic apparatus 100 in the data mode (carrier aggregation active) may actually receive data through the carrier. In a situation where a plurality of carriers are set, the electronic apparatus 100 in the release mode (carrier aggregation release) may perform an operation of releasing an activation state or removing the set carriers.

When the CA mode is the setting mode, a frequency signal may be received using the added carriers. However, when only the pilot signal, which is not actual data, is received during a short time (e.g., 6 ms per cycle of 1 s) in a specific period, it may be efficient for the CP 110 to use a predefined RF port. When the RF port predefined with respect to the added carrier is used in the case where the CA mode is the setting mode, the performance of the existing frequency may be degraded. Accordingly, according to an embodiment, in only the data mode among the CA mode, it may be effective to use the RF port determined based on the context information.

In an embodiment, it may be assumed that the electronic apparatus 100 operates in the first condition. According to an embodiment, in the first condition, the electronic apparatus 100 may be configured to use a first RF port in the first frequency band and configured to use the first RF port even in a second frequency band.

In an embodiment, the modem 111 may generate context information including CA mode information. The mid-layer 113 may obtain the CA mode information from the modem 111 and may determine whether the second condition is satisfied, based on the obtained CA mode information.

According to an embodiment, when the CA mode indicates the data mode, the mid-layer 113 may determine that the second condition is satisfied. The mid-layer 113 may determine the RF port matched with the second condition. In an embodiment, the RF port matched with the second condition may be defined in advance. In an embodiment, the mid-layer 113 may determine the RF port matched with the second condition as a first RF port with respect to the first frequency band; and the mid-layer 113 may determine the RF port matched with the second condition as a second RF port with respect to the second frequency band.

According to an embodiment, when the CA mode indicates the setting mode, the mid-layer 113 may determine that the first condition is satisfied. The mid-layer 113 may determine the RF port matched with the first condition. In an embodiment, the RF port matched with the first condition may be the preset RF port. For example, the electronic apparatus 100 may set an optimal RF port for each frequency band in advance, regardless of the state of the electronic apparatus. The RF port matched with the first condition may be set in advance. In other words, the RF port may be an RF port set by default for each of a plurality of frequency bands supported by the electronic apparatus 100.

The mid-layer 113 may deliver port information including the determined port information to the RF driver 115. The RF driver 115 may set the RFIC 131 based on the port information.

The RFIC 131 may obtain a signal in the first frequency band via the first RF port and may obtain a signal in a second frequency band via the second RF port.

According to an embodiment, the electronic apparatus 100 may use the RF port determined in real time in the data mode; when the CA mode is the setting mode or the release mode, the electronic apparatus 100 may use the predefined RF port.

In another embodiment, the context information is peripheral device connection information and the second condition may be a state where a peripheral device is connected. For example, the peripheral device may be universal serial bus (USB) or an ear jack. Because interference may occur in the signal received through the antenna when the peripheral device such as USB or an ear jack is connected, the electronic apparatus 100 may change the RF port to receive a signal via an antenna spaced from the connection point of the peripheral device. When the peripheral device is connected to an ear jack, the electronic apparatus 100 may determine that the second condition is satisfied, and may determine an RF port to be used for each frequency band.

In still another embodiment, the electronic apparatus 100 may determine another port for which the case that CA is set is different from the case that CA is not set. For example, in the frequency band allocated to PCC when CA is not set, the electronic apparatus 100 may allocate another port different from the port in the case where CA is set.

When CA is set, the electronic apparatus 100 may allocate ports different from one another, to the frequency band allocated to PCC and SCC. Because PCC performs a role of transmitting control information via a control channel, the electronic apparatus 100 may allocate a port advantageous for the transmission to PCC. For example, the electronic apparatus 100 may allocate a port that is less interfered with by PCC.

Figure 5:
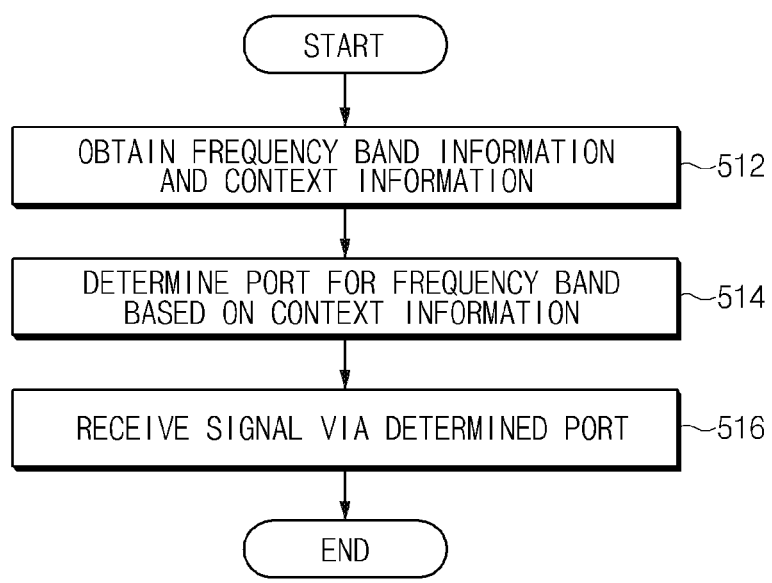
FIG. 5 is a flowchart of a method of determining a port, according to an embodiment.

FIG. 5 is a flowchart of a method of determining an RF port, according to an embodiment.

Hereinafter, the details about FIG. 5 will be described based on the electronic apparatus 100 or the processor 110 of FIG. 1.

In operation 512, the electronic apparatus may obtain frequency band information and context information. In an embodiment, the frequency band information may include information of a frequency band in which an electronic apparatus transmits and receives a signal. In another embodiment, the frequency band information may include information about a plurality of frequency bands and/or CA frequency bands, in each of which the electronic apparatus transmits and receives a signal.

In operation 514, the electronic apparatus may determine at least one RF port among a plurality of RF ports, based on the obtained frequency band information and the obtained context information. According to an embodiment, the electronic apparatus may determine an RF port for each frequency band, based on the context information. In an embodiment, a single RF port may deliver a signal in a plurality of frequency bands.

In an embodiment, the context information may include the information obtained from an AP (e.g., 150) and the information obtained from a sensor (e.g., 160). In another embodiment, the context information may include CA mode information.

In an embodiment, the electronic apparatus may determine whether a specific condition is satisfied, based on the obtained context information. When the specific condition is satisfied, the electronic apparatus may determine the RF port corresponding to the specific condition. The RF port may be the port mapped to the specific condition.

In operation 516, the electronic apparatus may receive a signal via the determined RF port. In an embodiment, the electronic apparatus may receive a signal in a specific frequency band via the RF port determined for the specific frequency band.

Figure 6:
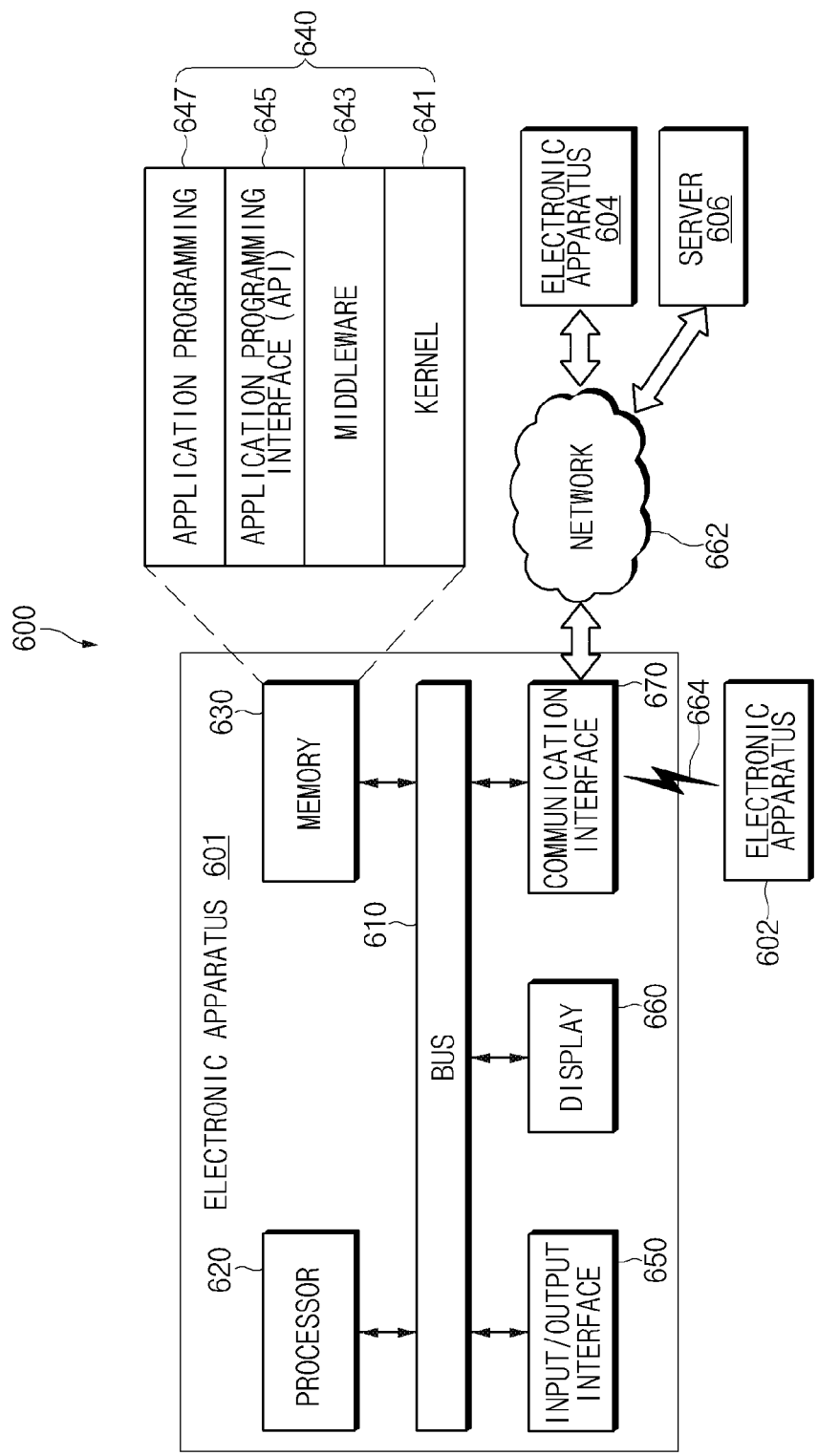
FIG. 6 illustrates an electronic apparatus in a network environment, according to various embodiments.

FIG. 6 illustrates an electronic apparatus in a network environment, according to various embodiments.

Referring to FIG. 6, according to various embodiments, an electronic apparatus 601, a first electronic apparatus 602, a second electronic apparatus 604, or a server 606 may be connected each other over a network 662 or a short range communication 664. The electronic apparatus 601 may include a bus 610, a processor 620, a memory 630, an input/output interface 650, a display 660, and a communication interface 670. According to an embodiment, the electronic apparatus 601 may not include at least one of the above-described components or may further include other component(s).

For example, the bus 610 may interconnect the above-described components 610 to 670 and may include a circuit for conveying communications (e.g., a control message and/or data) among the above-described components.

The processor 620 may include one or more of a central processing unit (CPU), an application processor (AP), or a communication processor (CP). For example, the processor 620 may perform an arithmetic operation or data processing associated with control and/or communication of at least other components of the electronic apparatus 601.

The memory 630 may include a volatile and/or nonvolatile memory. For example, the memory 630 may store commands or data associated with at least one other component(s) of the electronic apparatus 601. According to an embodiment, the memory 630 may store software and/or a program 640. The program 640 may include, for example, a kernel 641, a middleware 643, an application programming interface (API) 645, and/or an application program (or "an application") 647. At least a part of the kernel 641, the middleware 643, or the API 645 may be referred to as an "operating system (OS)".

For example, the kernel 641 may control or manage system resources (e.g., the bus 610, the processor 620, the memory 630, and the like) that are used to execute operations or functions of other programs (e.g., the middleware 643, the API 645, and the application program 647). Furthermore, the kernel 641 may provide an interface that allows the middleware 643, the API 645, or the application program 647 to access discrete components of the electronic apparatus 601 so as to control or manage system resources.

The middleware 643 may perform, for example, a mediation role such that the API 645 or the application program 647 communicates with the kernel 641 to exchange data.

Furthermore, the middleware 643 may process task requests received from the application program 647 according to a priority. For example, the middleware 643 may assign the priority, which makes it possible to use a system resource (e.g., the bus 610, the processor 620, the memory 630, or the like) of the electronic apparatus 601, to at least one of the application program 647. For example, the middleware 643 may process the one or more task requests according to the priority assigned to the at least one, which makes it possible to perform scheduling or load balancing on the one or more task requests.

The API 645 may be, for example, an interface through which the application program 647 controls a function provided by the kernel 641 or the middleware 643, and may include, for example, at least one interface or function (e.g., an instruction) for a file control, a window control, image processing, a character control, or the like.

The input/output interface 650 may play a role, for example, of an interface which transmits a command or data input from a user or another external apparatus, to other component(s) of the electronic apparatus 601. Furthermore, the input/output interface 650 may output a command or data, received from other component(s) of the electronic apparatus 601, to a user or another external apparatus.

The display 660 may include, for example, a liquid crystal display (LCD), a light-emitting diode (LED) display, an organic LED (OLED) display, a microelectromechanical systems (MEMS) display, or an electronic paper display. The display 660 may display, for example, various contents (e.g., a text, an image, a video, an icon, a symbol, and the like) to a user. The display 660 may include a touch screen and may receive, for example, a touch, gesture, proximity, or hovering input using an electronic pen or a part of a user's body.

For example, the communication interface 670 may establish communication between the electronic apparatus 601 and an external apparatus (e.g., the first electronic apparatus 602, the second electronic apparatus 604, or the server 606). For example, the communication interface 670 may be connected to the network 662 over wireless communication or wired communication to communicate with the external apparatus (e.g., the second electronic apparatus 604 or the server 606).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 664. The short range communication 664 may include at least one of wireless fidelity (Wi-Fi), light fidelity (LiFi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic apparatus 601 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 662 may include at least one of telecommunications networks, for example, a computer network (e.g., LAN or WAN), an Internet, or a telephone network.

Each of the first and second electronic apparatuses 602 and 604 may be a device of which the type is different from or the same as that of the electronic apparatus 601. According to an embodiment, the server 606 may include a group of one or more servers. According to various embodiments, all or a portion of operations that the electronic apparatus 601 will perform may be executed by another or plural electronic apparatuses (e.g., the first electronic apparatus 602, the second electronic apparatus 604 or the server 606). According to an embodiment, in the case where the electronic apparatus 601 executes any function or service automatically or in response to a request, the electronic apparatus 601 may not perform the function or the service internally, but, alternatively additionally, it may request at least a portion of a function associated with the electronic apparatus 601 from another device (e.g., the electronic apparatus 602 or 604 or the server 606). The other electronic apparatus may execute the requested function or additional function and may transmit the execution result to the electronic apparatus 601. The electronic apparatus 601 may provide the requested function or service using the received result or may additionally process the received result to provide the requested function or service. To this end, for example, cloud computing, distributed computing, or client-server computing may be used.

Figure 7:
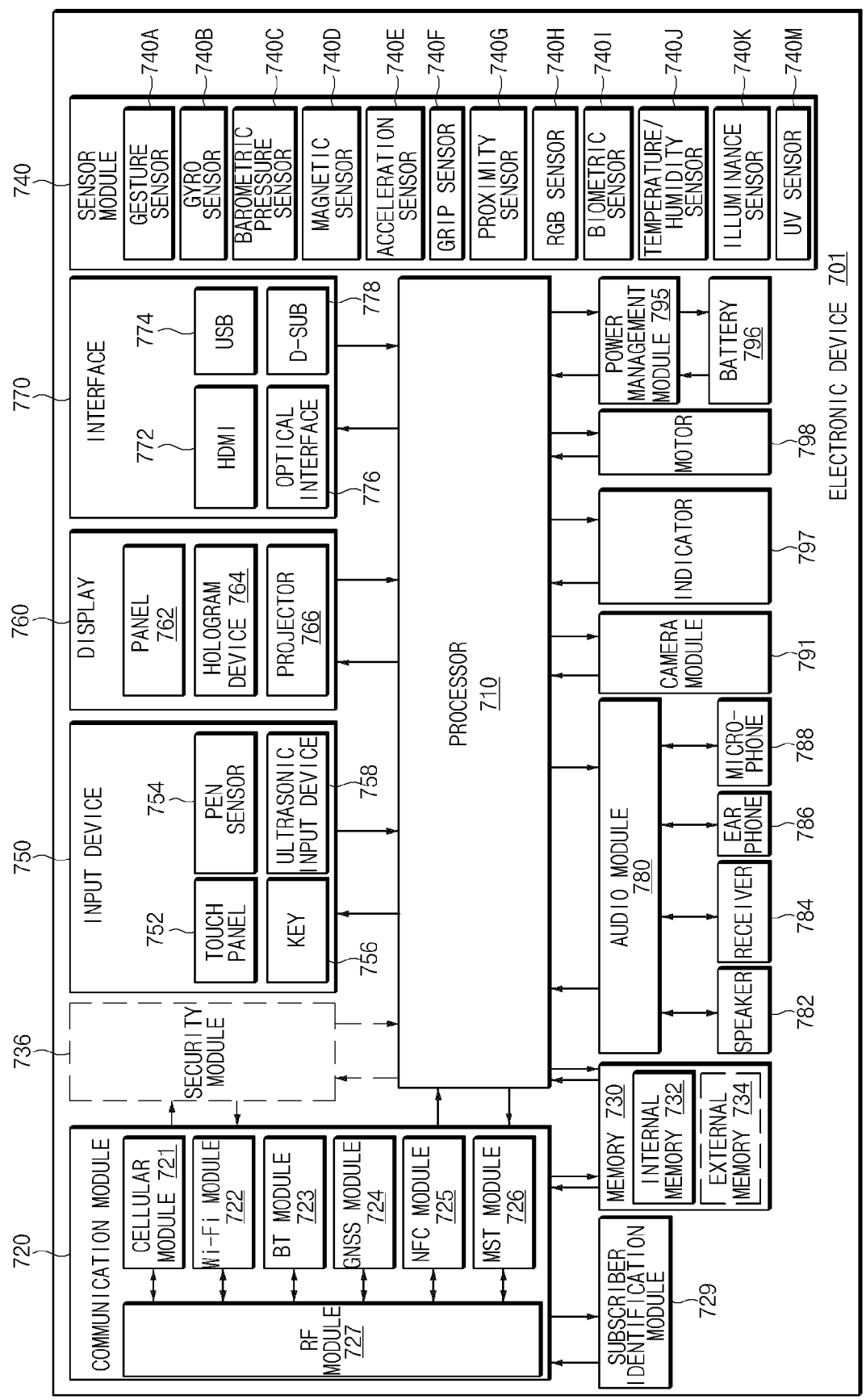
FIG. 7 is a block diagram of an electronic apparatus, according to various embodiments.

FIG. 7 illustrates a block diagram of an electronic apparatus, according to various embodiments.

Referring to FIG. 7, an electronic apparatus 701 may include, for example, all or a part of the electronic apparatus 601 illustrated in FIG. 6. The electronic apparatus 701 may include one or more processors (e.g., an application processor (AP)) 710, a communication module 720, a subscriber identification module 724, a memory 730, a sensor module 740, an input device 750, a display 760, an interface 770, an audio module 780, a camera module 791, a power management module 795, a battery 796, an indicator 797, and a motor 798.

The processor 710 may drive, for example, an operating system (OS) or an application to control a plurality of hardware or software components connected to the processor 710 and may process and compute a variety of data. For example, the processor 710 may be implemented with a System on Chip (SoC). According to an embodiment, the processor 710 may further include a graphic processing unit (GPU) and/or an image signal processor. The processor 710 may include at least a part (e.g., a cellular module 721) of components illustrated in FIG. 7. The processor 710 may load a command or data, which is received from at least one of other components (e.g., a nonvolatile memory), into a volatile memory and process the loaded command or data. The processor 710 may store a variety of data in the nonvolatile memory.

The communication module 720 may be configured the same as or similar to the communication interface 670 of FIG. 6. The communication module 720 may include the cellular module 721, a Wi-Fi module 722, a Bluetooth (BT) module 723, a GNSS module 724 (e.g., a GPS module, a Glonass module, a Beidou module, or a Galileo module), a near field communication (NFC) module 725, a MST module 726 and a radio frequency (RF) module 727.

The cellular module 721 may provide, for example, voice communication, video communication, a character service, an Internet service, or the like over a communication network. According to an embodiment, the cellular module 721 may perform discrimination and authentication of the electronic apparatus 701 within a communication network by using the subscriber identification module (e.g., a SIM card) 729. According to an embodiment, the cellular module 721 may perform at least a portion of functions that the processor 710 provides. According to an embodiment, the cellular module 721 may include a communication processor (CP).

Each of the Wi-Fi module 722, the BT module 723, the GNSS module 724, the NFC module 725, or the MST module 726 may include a processor for processing data exchanged through a corresponding module, for example. According to an embodiment, at least a part (e.g., two or more) of the cellular module 721, the Wi-Fi module 722, the BT module 723, the GNSS module 724, the NFC module 725, or the MST module 726 may be included within one Integrated Circuit (IC) or an IC package.

For example, the RF module 727 may transmit and receive a communication signal (e.g., an RF signal). For example, the RF module 727 may include a transceiver, a power amplifier module (PAM), a frequency filter, a low noise amplifier (LNA), an antenna, or the like. According to another embodiment, at least one of the cellular module 721, the Wi-Fi module 722, the BT module 723, the GNSS module 724, the NFC module 725, or the MST module 726 may transmit and receive an RF signal through a separate RF module.

The subscriber identification module 729 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 730 (e.g., the memory 630) may include an internal memory 732 or an external memory 734. For example, the internal memory 732 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 734 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 734 may be operatively and/or physically connected to the electronic apparatus 701 through various interfaces.

A security module 736 may be a module that includes a storage space of which a security level is higher than that of the memory 730 and may be a circuit that guarantees safe data storage and a protected execution environment. The security module 736 may be implemented with a separate circuit and may include a separate processor. For example, the security module 736 may be in a smart chip or a secure digital (SD) card, which is removable, or may include an embedded secure element (eSE) embedded in a fixed chip of the electronic apparatus 701. Furthermore, the security module 736 may operate based on an operating system (OS) that is different from the OS of the electronic apparatus 701. For example, the security module 736 may operate based on java card open platform (JCOP) OS.

The sensor module 740 may measure, for example, a physical quantity or may detect an operation state of the electronic apparatus 701. The sensor module 740 may convert the measured or detected information to an electric signal. For example, the sensor module 740 may include at least one of a gesture sensor 740A, a gyro sensor 740B, a barometric pressure sensor 740C, a magnetic sensor 740D, an acceleration sensor 740E, a grip sensor 740F, the proximity sensor 740G, a color sensor 740H (e.g., red, green, blue (RGB) sensor), a biometric sensor 740I, a temperature/humidity sensor 740J, an illuminance sensor 740K, or an UV sensor 740M. Although not illustrated, additionally or alternatively, the sensor module 740 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 740 may further include a control circuit for controlling at least one or more sensors included therein. According to an embodiment, the electronic apparatus 701 may further include a processor that is a part of the processor 710 or independent of the processor 710 and is configured to control the sensor module 740. The processor may control the sensor module 740 while the processor 710 remains at a sleep state.

The input device 750 may include, for example, a touch panel 752, a (digital) pen sensor 754, a key 756, or an ultrasonic input unit 758. For example, the touch panel 752 may use at least one of capacitive, resistive, infrared and ultrasonic detecting methods. Also, the touch panel 752 may further include a control circuit. The touch panel 752 may further include a tactile layer to provide a tactile reaction to a user.

The (digital) pen sensor 754 may be, for example, a part of a touch panel or may include an additional sheet for recognition. The key 756 may include, for example, a physical button, an optical key, a keypad, or the like. The ultrasonic input device 758 may detect (or sense) an ultrasonic signal, which is generated from an input device, through a microphone (e.g., a microphone 788) and may check data corresponding to the detected ultrasonic signal. According to an embodiment, the touch panel 7352 may include a pressure sensor (or force sensor, interchangeably used hereinafter) that measures the intensity of touch pressure by a user. The pressure sensor may be implemented integrally with the touch panel 752, or may be implemented as at least one sensor separately from the touch panel 752.

The display 760 (e.g., the display 660) may include a panel 762, a hologram device 764, or a projector 766. The panel 762 may be the same as or similar to the display 660 illustrated in FIG. 6. The panel 762 may be implemented, for example, to be flexible, transparent or wearable. The panel 762 and the touch panel 752 may be integrated into a single module. The hologram device 764 may display a stereoscopic image in a space using a light interference phenomenon. The projector 766 may project light onto a screen so as to display an image. For example, the screen may be arranged in the inside or the outside of the electronic apparatus 701. According to an embodiment, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-subminiature (D-sub) 778. The interface 770 may be included, for example, in the communication interface 670 illustrated in FIG. 6. Additionally or alternatively, the interface 770 may include, for example, a mobile high definition link (MH) interface, a SD card/multi-media card (MMC) interface, or an infrared data association (IrDA) standard interface.

The audio module 780 may convert a sound and an electric signal in dual directions. At least a component of the audio module 780 may be included, for example, in the input/output interface 650 illustrated in FIG. 6. The audio module 780 may process, for example, sound information that is input or output through a speaker 782, a receiver 784, an earphone 786, or the microphone 788.

For example, the camera module 791 may shoot a still image or a video. According to an embodiment, the camera module 791 may include at least one or more image sensors (e.g., a front sensor or a rear sensor), a lens, an image signal processor (ISP), or a flash (e.g., an LED or a xenon lamp).

The power management module 795 may manage, for example, power of the electronic apparatus 701. According to an embodiment, a power management integrated circuit (PMIC), a charger IC, or a battery or fuel gauge may be included in the power management module 795. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 796 and a voltage, current or temperature thereof while the battery is charged. The battery 796 may include, for example, a rechargeable battery and/or a solar battery.

The indicator 797 may display a specific state of the electronic apparatus 701 or a part thereof (e.g., the processor 710), such as a booting state, a message state, a charging state, and the like. The motor 798 may convert an electrical signal into a mechanical vibration and may generate the following effects: vibration, haptic, and the like. Although not illustrated, a processing device (e.g., a GPU) for supporting a mobile TV may be included in the electronic apparatus 701. The processing device for supporting the mobile TV may process media data according to the standards of digital multimedia broadcasting (DMB), digital video broadcasting (DVB), MediaFlo™, or the like.

Each of the above-mentioned components of the electronic apparatus according to various embodiments of the disclosure may be configured with one or more parts, and the names of the components may be changed according to the type of the electronic apparatus. In various embodiments, the electronic apparatus may include at least one of the above-mentioned components, and some components may be omitted or other additional components may be added. Furthermore, some of the components of the electronic apparatus according to various embodiments may be combined with each other so as to form one entity, so that the functions of the components may be performed in the same manner as before the combination.

Figure 8:
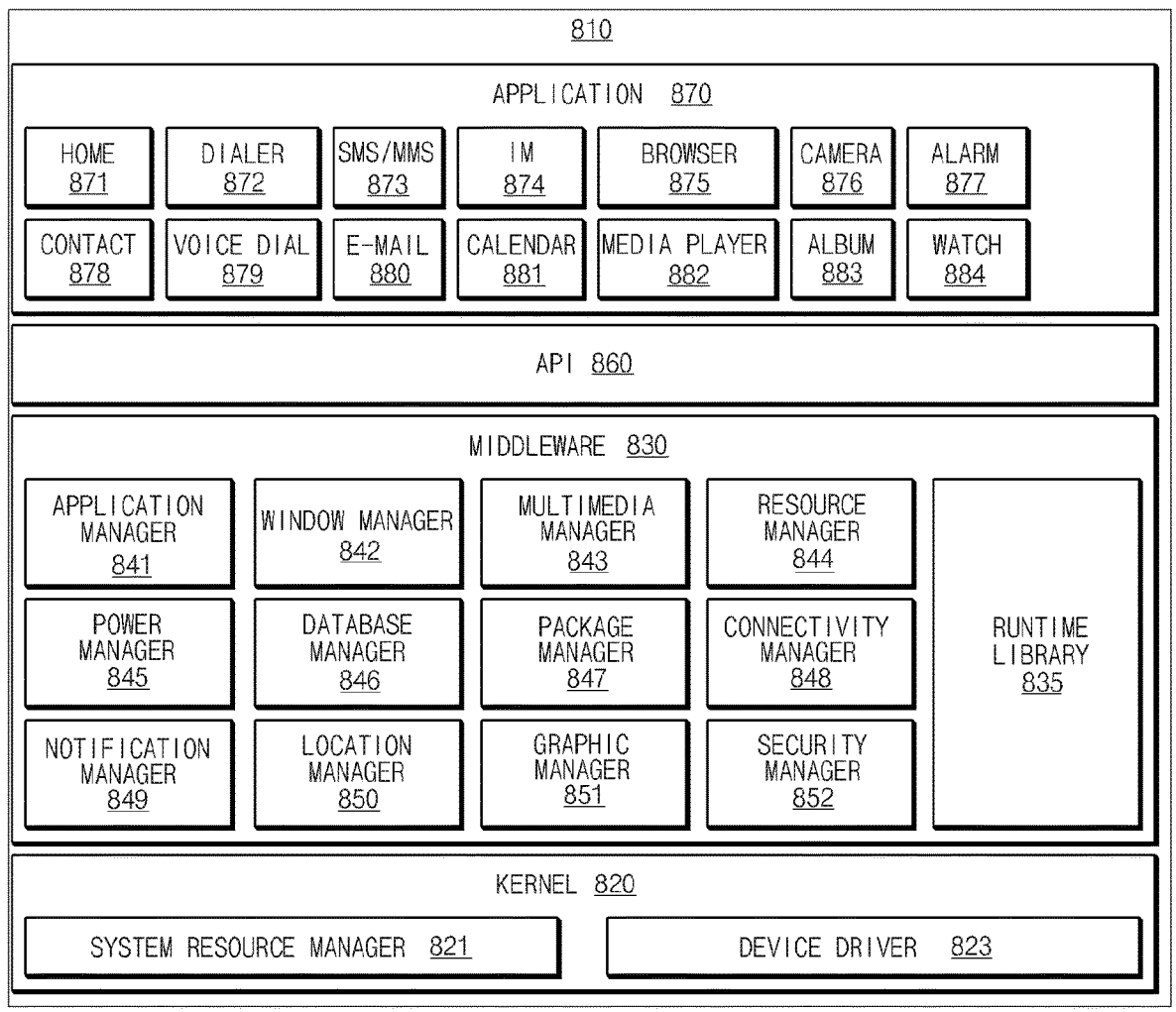
FIG. 8 illustrates a block diagram of a program module, according to various embodiments.

FIG. 8 illustrates a block diagram of a program module, according to various embodiments.

According to an embodiment, a program module 810 (e.g., the program 640) may include an operating system (OS) to control resources associated with an electronic apparatus (e.g., the electronic apparatus 601), and/or diverse applications (e.g., the application program 647) driven on the OS. The OS may be, for example, Android™, iOS™, Windows™, Symbian™, or Tizen™.

The program module 810 may include a kernel 820, a middleware 830, an application programming interface (API) 860, and/or an application 870. At least a portion of the program module 810 may be preloaded on an electronic apparatus or may be downloadable from an external electronic apparatus (e.g., the first electronic apparatus 602, the second electronic apparatus 604, the server 606, or the like).

The kernel 820 (e.g., the kernel 641) may include, for example, a system resource manager 821 or a device driver 823. The system resource manager 821 may perform control, allocation, or retrieval of system resources. According to an embodiment, the system resource manager 821 may include a process managing unit, a memory managing unit, or a file system managing unit. The device driver 823 may include, for example, a display driver, a camera driver, a Bluetooth driver, a shared memory driver, a USB driver, a keypad driver, a Wi-Fi driver, an audio driver, or an interprocess communication (IPC) driver.

The middleware 830 may provide, for example, a function that the application 870 needs in common, or may provide diverse functions to the application 870 through the API 860 to allow the application 870 to efficiently use limited system resources of the electronic apparatus. According to an embodiment, the middleware 830 (e.g., the middleware 643) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or a payment manager 854.

The runtime library 835 may include, for example, a library module that is used by a compiler to add a new function through a programming language while the application 870 is being executed. The runtime library 835 may perform input/output management, memory management, or capacities about arithmetic functions.

The application manager 841 may manage, for example, a life cycle of at least one application of the application 870. The window manager 842 may manage a graphic user interface (GUI) resource that is used in a screen. The multimedia manager 843 may identify a format necessary for playing diverse media files, and may perform encoding or decoding of media files by using a codec suitable for the format. The resource manager 844 may manage resources such as a storage space, memory, or source code of at least one application of the application 870.

The power manager 845 may operate, for example, with a basic input/output system (BIOS) to manage the capacity or temperature of a battery or power, and may provide power information for an operation of an electronic apparatus, using the corresponding information thereof. The database manager 846 may generate, search for, or modify database that is to be used in at least one application of the application 870. The package manager 847 may install or update an application that is distributed in the form of package file.

The connectivity manager 848 may manage, for example, wireless connection such as Wi-Fi or Bluetooth. The notification manager 849 may display or notify an event such as arrival message, appointment, or proximity notification in a mode that does not disturb a user. The location manager 850 may manage location information about an electronic apparatus. The graphic manager 851 may manage a graphic effect that is provided to a user, or manage a user interface relevant thereto. The security manager 852 may provide a general security function necessary for system security, user authentication, or the like. According to an embodiment, in the case where an electronic apparatus (e.g., the electronic apparatus 601) includes a telephony function, the middleware 830 may further include a telephony manager for managing a voice or video call function of the electronic apparatus.

The middleware 830 may include a middleware module that combines diverse functions of the above-described components. The middleware 830 may provide a module specialized to each OS kind to provide differentiated functions. Additionally, the middleware 830 may dynamically remove a part of the preexisting components or may add new components thereto.

The API 860 (e.g., the API 645) may be, for example, a set of programming functions and may be provided with a configuration that is variable depending on OS. For example, in the case where OS is Android™ or iOS™, it may provide one API set per platform. In the case where OS is Tizen™, it may provide two or more API sets per platform.

The application 870 (e.g., the application program 647) may include, for example, one or more applications capable of providing functions for a home 871, a dialer 872, an SMS/MMS 873, an instant message (IM) 874, a browser 875, a camera 876, an alarm 877, a contact 878, a voice dial 879, an e-mail 880, a calendar 881, a media player 882, an album 883, a watch 884, or for offering health care (e.g., measuring an exercise quantity, blood sugar, or the like) or environment information (e.g., information of barometric pressure, humidity, temperature, or the like).

According to an embodiment, the application 870 may include an application (hereinafter referred to as "information exchanging application" for descriptive convenience) to support information exchange between an electronic apparatus (e.g., the electronic apparatus 601) and an external electronic apparatus (e.g., the first electronic apparatus 602 or the second electronic apparatus 604). The information exchanging application may include, for example, a notification relay application for transmitting specific information to an external electronic apparatus, or a device management application for managing the external electronic apparatus.

For example, the notification relay application may include a function of transmitting notification information, which arise from other applications (e.g., applications for SMS/MMS, e-mail, health care, or environmental information), to an external electronic apparatus. Additionally, the notification relay application may receive, for example, notification information from an external electronic apparatus and provide the notification information to a user.

The device management application may manage (e.g., install, delete, or update), for example, at least one function (e.g., turn-on/turn-off of an external electronic apparatus itself (or a part) or adjustment of brightness (or resolution) of a display) of the external electronic apparatus which communicates with the electronic apparatus, an application running in the external electronic apparatus, or a service (e.g., a call service, a message service, or the like) provided from the external electronic apparatus.

According to an embodiment, the application 870 may include an application (e.g., a health care application of a mobile medical device) that is assigned in accordance with an attribute of an external electronic apparatus. According to an embodiment, the application 870 may include an application that is received from an external electronic apparatus (e.g., the first electronic apparatus 602, the second electronic apparatus 604, or the server 606). According to an embodiment, the application 870 may include a preloaded application or a third party application that is downloadable from a server. The names of components of the program module 810 according to the embodiment may be modifiable depending on kinds of operating systems.

According to various embodiments, at least a portion of the program module 810 may be implemented by software, firmware, hardware, or a combination of two or more thereof. At least a portion of the program module 810 may be implemented (e.g., executed), for example, by the processor (e.g., the processor 710). At least a portion of the program module 810 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 620), may cause the one or more processors to perform a function corresponding to the instruction. The computer-readable storage media, for example, may be the memory 630.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic apparatus comprising:
a communication circuit including a plurality of ports; and
a processor, wherein the processor is configured to:
obtain context information of the electronic apparatus;
determine at least one port to be used for each of at least one frequency band among the plurality of ports based on the obtained context information; and
transmit or receive a signal based on the determined at least one port,
wherein the context information includes at least one of sensor information of the electronic apparatus, peripheral device connection information, carrier aggregation (CA) mode information, or primary component carrier (PCC) or secondary component carrier (SCC) information, and
wherein the processor is further configured to determine another port when the sensor information is a second state, which is different from the at least one port to be used in the at least one frequency band when the sensor information is a first state.

2. The electronic apparatus of claim 1, wherein the communication circuit includes a radio frequency integrated circuit (RFIC), and
wherein the RFIC includes the plurality of ports.

3. The electronic apparatus of claim 1, wherein the electronic apparatus includes another processor and a sensor, which are electrically connected to the processor, and
wherein the context information includes information obtained from at least one of the processor, the another processor, or the sensor.

4. The electronic apparatus of claim 1, wherein the plurality of ports are respectively associated with a plurality of antennas having different performances or a plurality of antennas having different performances each of which is changed depending on the context information.

5. The electronic apparatus of claim 1, wherein the communication circuit includes a plurality of radio frequency front ends (RFFEs) associated with the plurality of ports.

6. The electronic apparatus of claim 1, wherein the CA mode information indicates one of a setting mode, a data mode, or a release mode, and
wherein the processor is configured to:
determine the another port in the data mode, which is different from a port in the setting mode, with respect to the at least one frequency band.

7. The electronic apparatus of claim 1 wherein the processor is configured to:
determine the another port when a peripheral device is connected, which is different from the at least one port to be used in the at least one frequency band when the electronic apparatus and the peripheral device are not connected to each other.

8. The electronic apparatus of claim 1 wherein the processor is configured to:
when the at least one frequency band includes [[a]]the PCC and [[a]]the SCC, determine the another port different from a port of the SCC, with respect to the PCC.

9. The electronic apparatus of claim 1, wherein the processor includes:
a mid-layer configured to determine the at least one port to be used, based on the obtained context information; and
a radio frequency (RF) driver that allows the communication circuit to use the determined at least one port.

10. The electronic apparatus of claim 1, wherein the processor is configured to:
when determining a port based on the obtained context information, determine whether the obtained context information satisfies a specific condition; and
determine a port mapped to the specific condition as a port for the at least one frequency band.

11. An electronic apparatus comprising:
a communication circuit configured to support a plurality of frequency bands, in each of which a port is predefined with respect to each frequency band; and
a processor, wherein the processor is configured to:
obtain information comprising at least one of frequency band information indicating at least one frequency band or context information indicating a state of the electronic apparatus, by the electronic apparatus;
determine another port different from the predefined port, with respect to one or more frequency bands among the at least one frequency band based on the obtained information; and
transmit or receive a signal of the plurality of frequency bands using the determined another port.

12. The electronic apparatus of claim 11, wherein the context information includes at least one of information about a peripheral device connected to the electronic apparatus, sensor information of the electronic apparatus, peripheral device connection information, Wi-Fi connection information, frequency band information, carrier aggregation (CA) mode information, primary component carrier (PCC) or secondary component carrier (SCC) information, and screen information.

13. The electronic apparatus of claim 11, wherein the processor is configured to:
when the context information satisfies a specific condition, determine the another port different from the predefined port, with respect to one or more frequency bands among the at least one frequency band based on the obtained information.

* * * * *